United States Patent [19]

Okutsu

[11] Patent Number: 4,782,410
[45] Date of Patent: Nov. 1, 1988

[54] HOUSING STRUCTURE FOR FIXED MAGNETIC DISK DEVICE

[75] Inventor: Naohiro Okutsu, Kamakura, Japan
[73] Assignee: Mitsubishi Denki K.K., Tokyo, Japan
[21] Appl. No.: 51,915
[22] Filed: May 19, 1987
[30] Foreign Application Priority Data
May 19, 1986 [JP] Japan ............................. 61-74917[U]
[51] Int. Cl.⁴ ......................... G11B 5/48; G11B 21/16
[52] U.S. Cl. ..................................... 360/98; 360/105; 360/97
[58] Field of Search ..................... 360/97–99, 360/105, 104

[56] References Cited

U.S. PATENT DOCUMENTS

| 4,677,509 | 6/1987 | Nishida et al. | 360/97 |
| 4,689,703 | 8/1987 | Olbrich et al. | 360/97 |
| 4,692,827 | 9/1987 | Biermeier et al. | 360/97 |
| 4,714,972 | 12/1987 | Biermeier et al. | 360/97 |

FOREIGN PATENT DOCUMENTS

| 56-169272 | 12/1981 | Japan. | |
| 58-102364 | 6/1983 | Japan | 360/97 |
| 58-196666 | 11/1983 | Japan | 360/97 |
| 60-182053 | 9/1985 | Japan. | |

*Primary Examiner*—John H. Wolff
*Assistant Examiner*—Matthew J. Bussan
*Attorney, Agent, or Firm*—Takeuchi Patent Office

[57] ABSTRACT

A fixed magnetic disk device having a spindle for rotating a disk and an actuator for moving a magnetic head, which comprises a housing having a trapezoidal or triangular shape with two openings on its sides at right angles, one of the openings being provided with a mounting flange for supporting both ends of the spindle, and the other opening adapted to receive the actuator, and a pair of covers flanged to both the openings.

3 Claims, 2 Drawing Sheets

HOUSING STRUCTURE FOR FIXED MAGNETIC DISK DEVICE

BACKGROUND OF THE INVENTION

1. Field of the Invention

The present invention relates generally to fixed magnetic disk devices, particularly to a fixed magnetic disk device with a housing for supporting a spindle and an actuator.

2. Description of the Prior Art

Japanese Patent Kokai No. 56-169,271 shows a fixed magnetic disk device such as shown in FIG. 4. A spindle 1 is equipped with magnetic disks 2. In the split type housings 3 and 4, the spindle 1 is rotatably supported on the mounting section 5 of the housing 3 to which the other housing 4 is connected and fixed. A mounting section 6 is provided for the actuator (not shown) in the housing 3.

Because fixed magnetic disk devices according to the prior art are made as mentioned above, one can easily install a linear type actuator. However, it is structurally difficult to install a rotary type actuator.

SUMMARY OF THE INVENTION

Accordingly, it is an object of the invention to provide a fixed magnetic disk device on which a rotary actuator can be mounted, having improved assembly precision and miniaturization, that can be designed for high performance.

According to the present invention there is provided a fixed magnetic disk device comprising a housing with two sides having openings at right angles making a triangular or trapezoidal shape and covers mounted on each opening flange for supporting an actuator and a spindle.

In the housing of this magnetic disk device according to the invention, the processing of the openings, the two right angle sides being taken as reference surfaces, is possible. Spindle mounting surface processing and actuator mounting become possible, and they can be assembled with high precision. Furthermore, maintaining stiffness in the smallest shapes and weight reduction are achievable.

Other objects, features, and advantages of the present invention will be more apparent from the following description taken in conjunction with the accompanying drawings.

DESCRIPTION OF THE PREFERRED EMBODIMENTS

Figure 1:
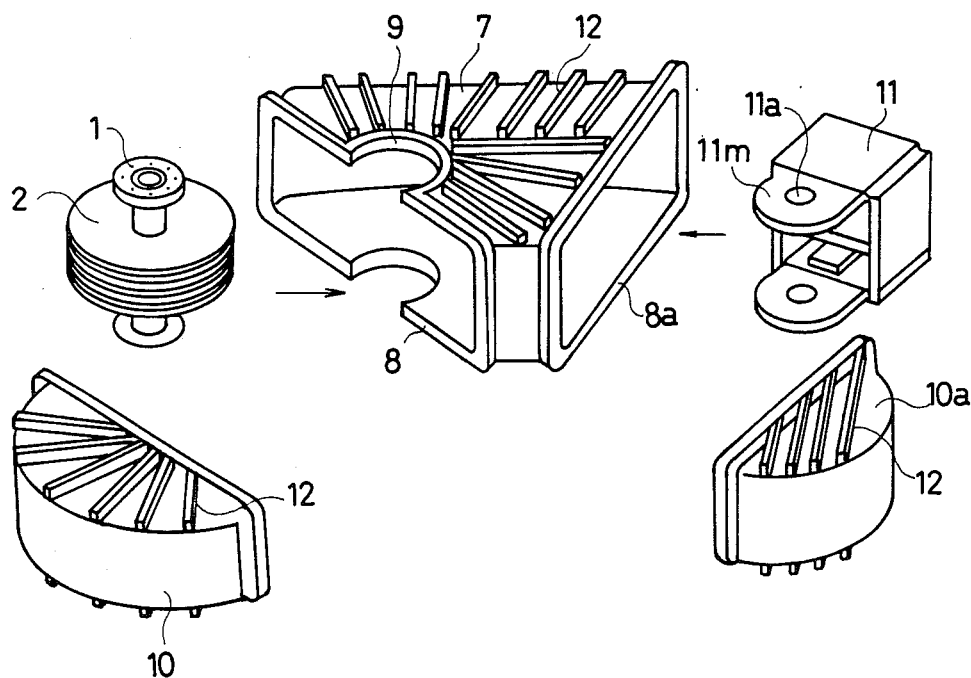
FIG. 1 is an exploded perspective view of a fixed magnetic disk device embodying the present invention.
Figure 4:
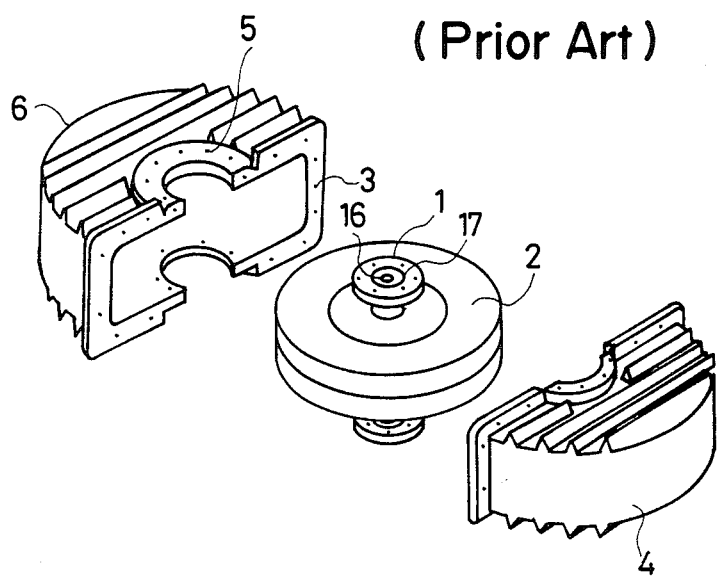
FIG. 4 is an exploded perspective view of a fixed magnetic disk device according to the prior art.
Figure 2:
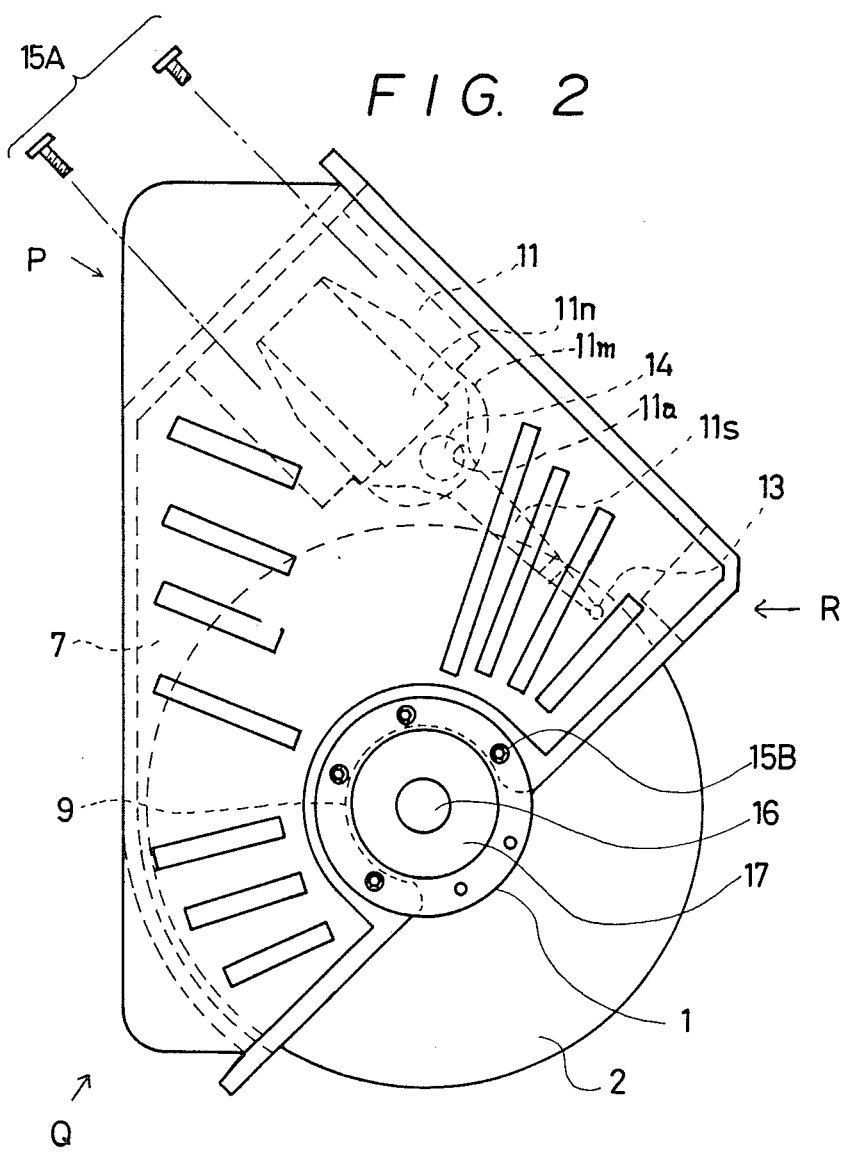
FIG. 2 is a top view of the disk device of FIG. 1.
Figure 3:
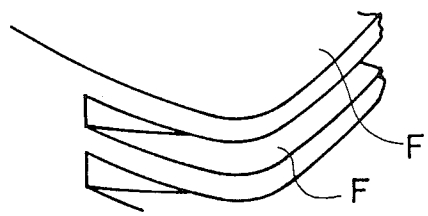
FIG. 3 shows a part of the disk device viewed from an arrow P, Q, or R in FIG. 2.

Referring now to FIGS. 1 through 3 there is shown a fixed magnetic disk device consisting of a right angled triangular housing 7 in which two sides are at right angles. The housing 7 has a pair of mounting flanges 9 on the upper and lower parts of an opening flange 8 of one side. A spindle 1 stacked with magnetic disks 2 is pivotably supported on the mounting flanges 9 with screws 15B and has bearings 17 and a rotating shaft 16 to which the disks are mounted. A semi-circular cover 10 is joined on the opening flange 8 so as to cover the disks. An actuator supporting section 11 is received into the housing 7 through the other opening. A cover 10a is joined to the flange 8a.

As best shown in FIG. 2, the supporting section 11 has an opening 11a of a jaw section 11m to pivotally support an actuator 11n through a shaft 14. The support section 11 is mounted on the back of the housing 7 with screws 15A. The actuator 11n is turned about the shaft 14 under magnetic forces so as to move its magnetic head 13 on the arm 11s in a radial direction of the disks for reading or writing information. A plurality of heat rdiating fins 12 are provided on the housing 7 and the covers 10 and 10a.

As best shown in FIG. 3, three corners P, Q, and R of the housing 7 are provided with a plurality of fins F for increasing heat radiation effects.

In assembling the fixed magnetic disk device, after both axle ends of the spindle 1 are supported on the mounting flanges 9, the cover 10 is mounted on the flange 8. Meanwhile, the support section 11, to which the actuator 11n is attached, is received into the housing 7 through the other opening, and the cover 10a is mounted on the flange 8a completing the assembly.

According to this structure, along with the positional aberration in the space between the spindle and actuator being reduced, taking the two right angle sides as reference surfaces, high precision assembly of the spindle and actuator becomes possible. As well, because the actuator and spindle are supported in one housing, the covers 10 and 10a are stiff and small, and as a whole weight reduction can be well designed.

Moreover, in the present embodiment, the housing has a right angle triangular shape, but other trapezoidal shapes having two sides at right angles or pentagons with the corner opposite to the right angle flattened will also do.

As has been described above, according to the present invention there is provided a fixed magnetic disk device comprising a housing with two sides having openings at right angles making a triangular or trapezoidal shape and covers mounted on each opening flange for supporting an actuator and a spindle. It is therefore possible to mount a rotary type actuator, with improved assembly precision, and reduce the positional aberration of the actuator and spindle caused by temperature. Furthermore, miniaturization, high performance and weight reduction can be achieved.

Although a preferred embodiment of the present invention has been described using specific terms, such description is given for illustrative purpose only, and it is to be understood that changes and variations may be made without departing from the spirit and scope of the invention defined in the following claims.

What is claimed is:

1. A housing structure for a fixed magnetic disk device, which comprises:
   a housing body having a polygonal shape defined by a plurality of sides;
   first and second sides of said polygonal housing body being made at right angles making first and second reference sides;
   said first reference side having a first opening with a mounting flange on which a magnetic disk stack may be pivotally mounted with a spindle;

said second reference side having a second opening through which a rotational positioner may be inserted widthwise and mounted on a third side of said polygonal housing body;

a first cover to be mounted on said first reference side for covering said first opening; and a second cover to be mounted on said second reference side for covering said second opening, thereby providing a housing structure which is rigid and compact yet easy-to-assemble with high precision.

2. A housing structure for a fixed magnetic disk device, which comprises:

a housing body having a trapezoidal shape defined by four sides;

first and second sides of said trapezoidal housing body being made at right angles making first and second reference sides while a third side made at right angles with said second reference side so that said third side become parallel with respect to said first reference side;

said first reference side having a first opening with a mounting flange on which a magnetic disk stack may be pivotally mounted with a spindle;

said second reference side having a second opening through which a rotational positioner may be inserted widthwise and mounted on said third side;

a first cover to be mounted on said first reference side for covering said first opening; and a second cover to be mounted on said second reference side for covering said second opening, thereby providing a housing structure which is rigid and compact yet easy-to-assemble with high precision.

3. The housing structure of claim 2, wherein said rotational positioner comprises:

a supporting section mounted on said third side;

an actuator pivotally supported by said supporting section;

an arm extending from said actuator in a direction perpendicular to said first reference side and parallel to said second reference side; and a magnetic head mounted on a free end of said arm so that it is moved in a radial direction of said disk stack when said actuator is pivoted on said supported section.

* * * * *